Sept. 20, 1949.　　　　G. J. ARNOLD　　　　2,482,571
CAMERA FOCUSING STRUCTURE HAVING
PIVOTED SUPPLEMENTARY LENS
Filed March 31, 1945　　　　　　　　3 Sheets—Sheet 1
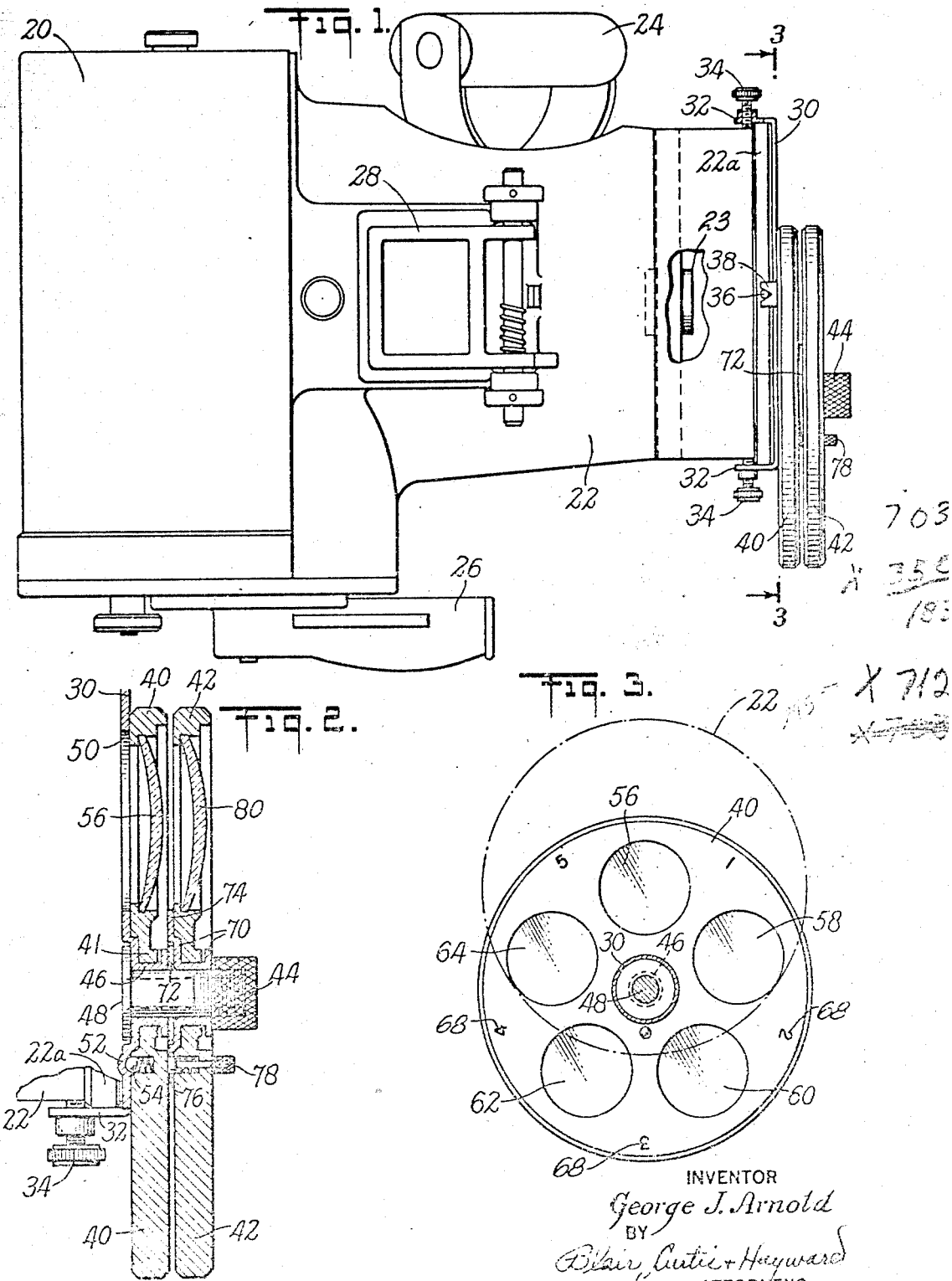
INVENTOR
George J. Arnold
BY
Blair, Curtis & Hayward
ATTORNEYS

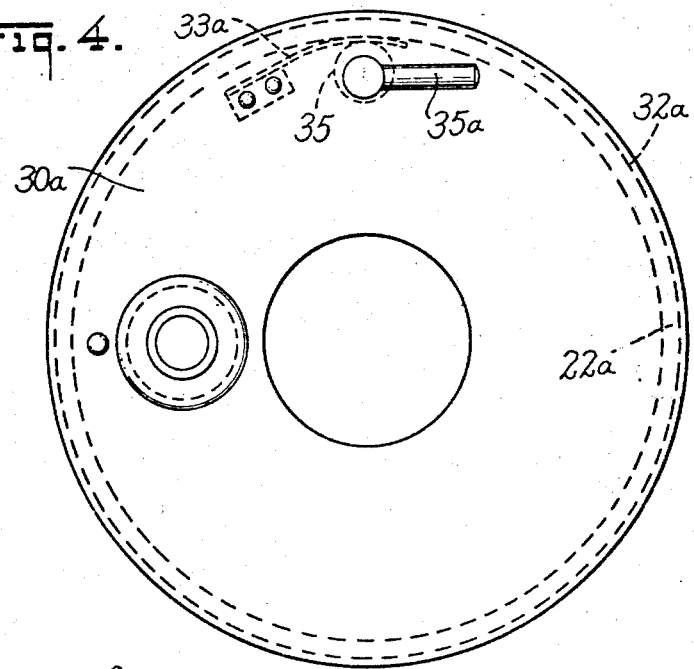
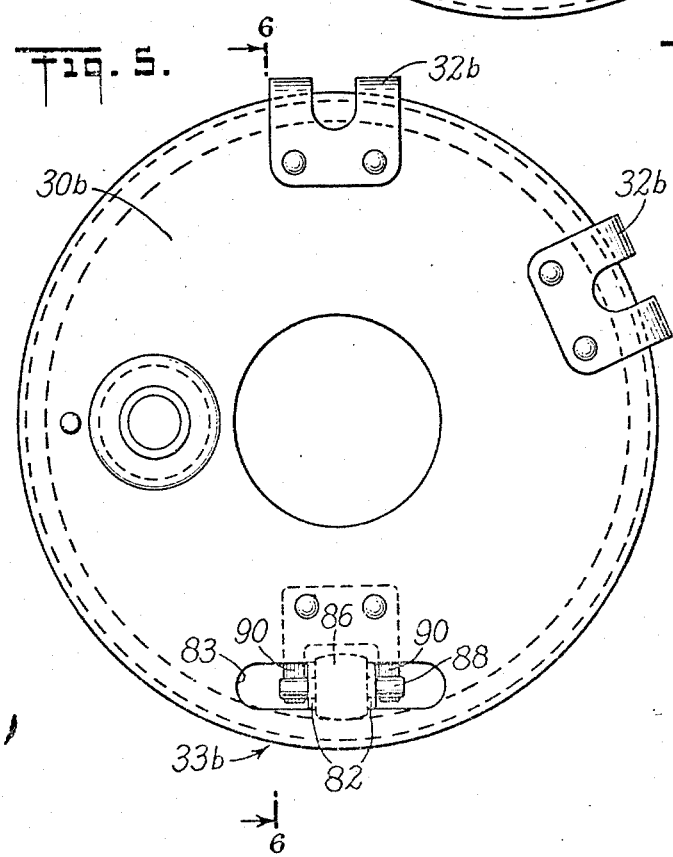
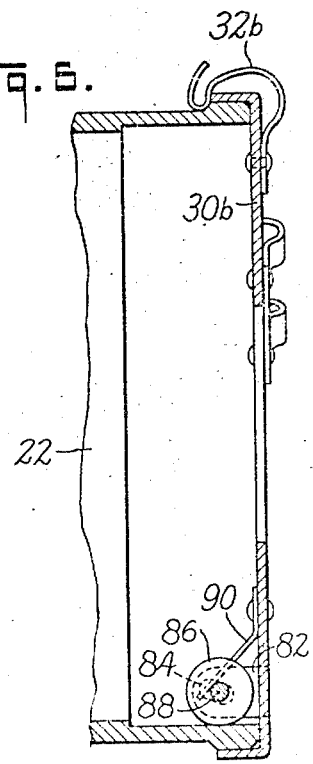

Sept. 20, 1949.　　　　G. J. ARNOLD　　　　2,482,571
CAMERA FOCUSING STRUCTURE HAVING
PIVOTED SUPPLEMENTARY LENS Filed March 31, 1945　　　　　　　　3 Sheets-Sheet 3

INVENTOR
George J. Arnold
BY
Blair, Curtis & Hayward
ATTORNEYS

Patented Sept. 20, 1949

2,482,571

UNITED STATES PATENT OFFICE 2,482,571

CAMERA FOCUSING STRUCTURE HAVING PIVOTED SUPPLEMENTARY LENS

George J. Arnold, Jackson Heights, N. Y., assignor to Fairchild Camera and Instrument Corporation, Jamaica, N. Y., a corporation of Delaware Application March 31, 1945, Serial No. 585,883

4 Claims. (Cl. 95—44)

This invention relates to camera focusing structures. More specifically it pertains to a lens combination whereby a fixed focus type of camera may be utilized to take clear pictures within a range of distances from the camera less than the infinity object distance of the camera lens.

In the past a number of high speed cameras have been developed which have been capable of taking consistently clear pictures with a minimum of adjustments. These cameras have worked particularly well for distant panoramas such as occur in aerial photography because of the fact that the range of objects there photographed always fell within the infinity focus of the camera lens. Some of these cameras have been of fixed focus optical construction for the purpose of eliminating those operational details ordinarily attendant to accurate focusing—thus making it possible to build into the camera a pair of special hand grips for supporting the camera in shooting position whereby winding the film and tripping the lens shutter might be effected with a minimum of operating motions. With such a camera it becomes possible to take a series of photographs in rapid succession without lowering the camera from shooting position and with assurance that a high quality photograph will be obtained in each instance so long as the camera is held steady and the desired objective is maintained within the finder.

The principal objection to cameras of the above type has been that their range of utility is somewhat restricted because of the fixed focus character which has heretofore been concomitant with their successful operation. I have discovered a camera focusing structure which may be incorporated in photographic equipment of the above-described type whereby supplementary optical elements may be brought into operation when the camera is to be used for close-up pictures, i. e., for pictures closer than, for example, seventy-five feet. Normally fixed focus cameras embodying my focusing attachment can be used over the expanded range in the same manner as before without moving the hands from the camera grips and without sacrifice of the manual ease and photographic accuracy which have made these cameras so successful. It is accordingly an object of my invention to provide a practicable camera focusing structure which overcomes the above and other disadvantages which have inhered in previous cameras of the types already mentioned.

The invention accordingly consists in the features of construction, combinations of elements and arrangements of parts as will be exemplified in the structure to be hereinafter described and the scope of the application of which will be set forth in the accompanying claims.

In the drawings:

Figure 1 is a plan view of a fixed focus camera incorporating a focusing structure embodying my invention;

Figure 2 is an enlarged sectional view of a part of the structure illustrated in Figure 1;

Figure 3 is a sectional view taken along the line 3—3 of Figure 1;

Figure 4 is an enlarged front elevational view of a modified form of a portion of the camera focusing structure with parts removed;

Figure 5 is a front elevational view similar to that of Figure 4 but showing a modified type of structure;

Figure 6 is a sectional view taken along the line 6—6 of Figure 5; and,

Figure 7:
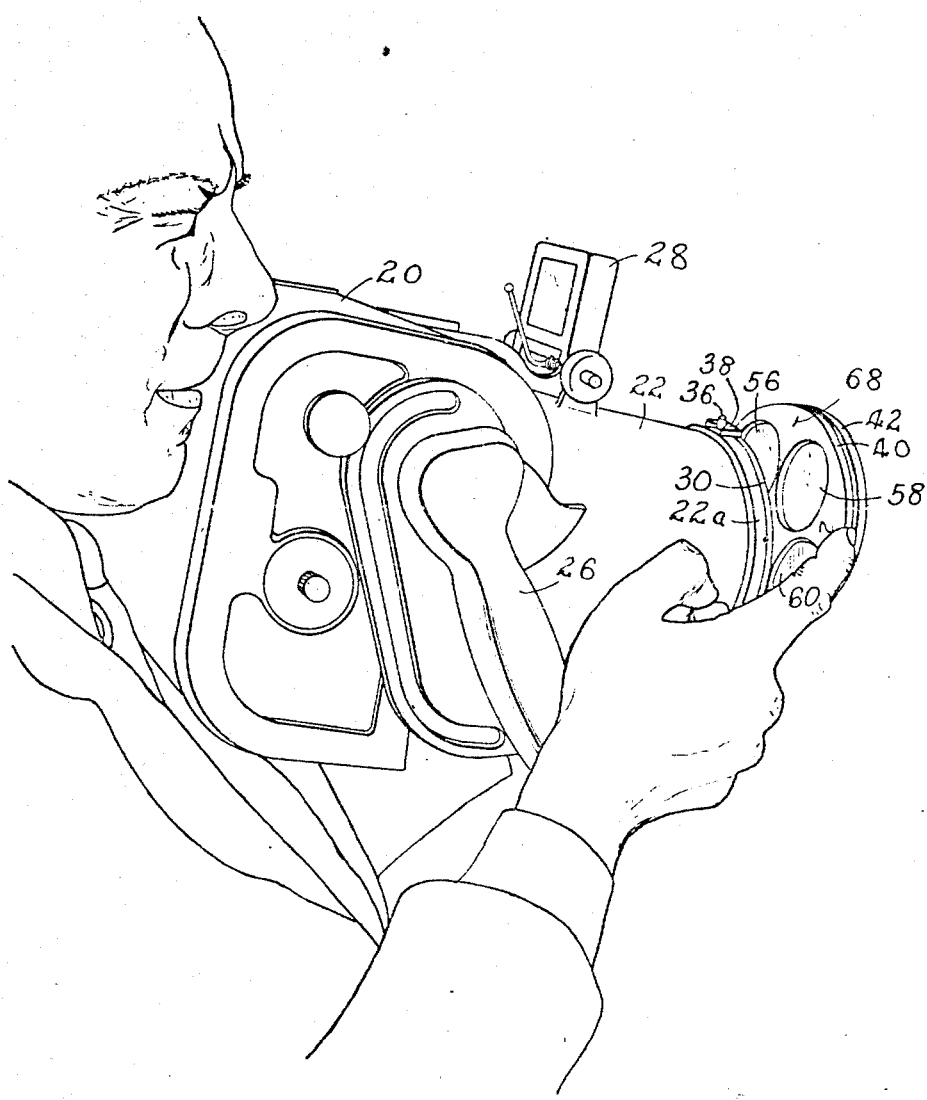
Figure 7 is a perspective view of the camera held in shooting position by an operator.

In Figure 1 a camera generally indicated by 20 includes a cone 22, a fixed focus lens 23, a hand grip 24 for supporting the camera and a film winding and shutter control handle 26. A conventional view finder 28 is mounted on the top of the camera cone. Cone 22 has a flange 22a at its open end to receive a mounting ring 30 having clamping tabs 32 and thumb screws 34 for engaging the cone back of flange 22a to clamp the ring on the camera cone (see also Figure 2). Mounting ring 30 is also provided with aligning ears 38 adapted to straddle a pin 36 on flange 22a so that the ring may be accurately registered angularly with the camera's optical axis for purposes described more fully hereinafter.

Mounting ring 30 serves as a base for a lens holder 40 and a filter holder 42 which are rotatably held in operative position upon the ring with the aid of a retainer nut 44. Figure 2 illustrates a flanged opening 46 within mounting ring 30 which serves as a seat for a screw 48 on which nut 44 is detachably threaded. Thus nut 44 is readily detachable to permit removal or substitution of holders 40 and 42. If only holder 40 is used, a suitable spacer (not shown) may be installed in place of holder 42. Mounting ring 30 has a clearance hole 50 so located as to permit unobstructed light access to the lens system of camera 20.

Mounting ring 30 is provided with a series of seats, one of which is shown at 52, spaced around flanged opening 46 for cooperating with a spring biased detent ball 54 carried within lens holder 40. Lens holder 40 is provided in the present embodiment with four angularly arranged openings in which are mounted four supplementary lenses indicated at 56, 58, 60 and 62. Holder 40 has a hub 41 by which the holder is rotatably mounted on flange 46. In addition holder 40 includes a lens opening 64 in which no optical element is located. The seats 52 are so arranged around opening 46 that detent ball 54 can maintain any selected lens, or the lens opening 64, coaxial with clearance hole 50 and the lens system of camera 20. The seats 52 and detent ball 54 are so constituted that they effect a self-centering action which correctly indexes the selected supplementary lens, or opening. Thus the lens holder may be rapidly adjusted with assurance of correct final registration.

In Figure 3 the dotted line 22 indicates the outline of the camera cone and a series of numerals or other suitable indicia on the lens holder is indicated by reference character 68. The relationship of lens holder 40 to view finder 28 is such that one of the numerals or indicia 68 is visible to the operator when the camera is held in shooting position (see Figure 7) to indicate which of the various supplementary lenses 56, 58, 60 or 62, or the lens opening 64, is aligned with the lens system of camera 20.

The filter holder 42 is carried by pivot screw 48 and is freely rotatable upon and with respect to a flanged bearing 70. Bearing 70 is spaced from flanged opening 46 by a spacer 72 and is provided with an inner flange 74 having cutouts 76 aligned with the seats or detents 52 of mounting ring 30. Holder 42 is provided with an index pin 78 which detachably locks the holder against rotation by cooperating with one of the cutouts 76. In Figure 2 a filter element 80 is illustrated in alignment with supplementary lens 56.

Thus in operation a selected filter may be used, depending upon the type of picture to be taken and the lighting qualities available, and a supplementary lens may be selected depending upon the distance between camera and object. The supplementary optical elements are so arranged that they may easily be moved and adjusted without lowering the camera from shooting position and lens opening 64 makes it possible to use the camera with a focus of infinity where distant objects are to be photographed. In this connection it should be noted that preferably the pivotal axis of holders 40 and 42 lies on that side of the optical axis of the camera which is adjacent the operating handle 26. Thus the holders or either of them are readily accessible to one of the photographer's hands and indeed may be rapidly and easily adjusted while the camera handle 24 is securely grasped by his other hand. It will appear then that the photographer may take successive pictures of an object which is moving toward or away from him by adjusting holder 40 between successive exposures as the circumstances demand. In the embodiment described handle 26 pivots forwardly angularly about one end for winding the film for the next picture. At the forward end of the winding stroke the operator can adjust lens holder 40 with one finger to prepare the optical system for the next picture.

In addition the mounting ring and supplementary lens carried thereby may easily be removed from the entire camera if all of the photographing to be done for a period of time is to be limited to distant objects. And the filter holder may be removed from the mounting ring as previously pointed out, leaving lens holder 40 in place. Thus, an individual filter may be applied, as the occasion demands, through lens opening 64 and clearance hole 50 and carried within the cone in conventional manner. When the camera and focusing structure are to be used for high speed press photography probably the filter holder will not be employed, but individual filters will be inserted into or removed from the cone from time to time depending upon conditions.

In Figure 4 a modified type of mounting ring is indicated at 30a wherein a clamping handle 32a is provided. Mounting ring 30a includes a rim 22a running therearound which may be telescoped over the open end of camera cone 22 and handle 32a may thereafter be swung to rock an eccentric 35 against a binding spring 33a to force the spring against the inside of cone 22 thus effecting a frictional engagement between the rim of the camera cone and the rim of the mounting ring. Binding spring 33a distributes the force of the clamping handle over an extended area of the rims of the mounting ring and camera cone. Ring 30a is also preferably equipped with aligning means (not shown) such as ears 38 (Figure 1).

A further modification is illustrated in Figures 5 and 6 wherein a pair of bifurcated clips 32b are attached to the upper portion of a mounting ring 30b provided with a lower releasable locking means generally indicated at 33b. Locking means 33b consists of a pair of inwardly lanced tabs 82 which leave a pair of access openings 83. Tabs 82 have slanting slots 84 cut therein which serve as journals for the trunnions 88 of a locking roller 86. A bifurcated locking spring 90 is riveted to the mounting ring so that the legs of the spring straddle roller 86 and engage trunnions 88 to urge the locking roller to the right, as viewed in Figure 6, and somewhat downwardly among slots 84. Thus, with the parts in the position illustrated in Figure 6, the lower portion of mounting ring 30b cannot readily be swung outwardly because of the cramping relationship between locking roller 86 and slots 84 which hold the roller against the interior of the flange of the camera cone. However, access openings 83 make it possible to push backwardly upon the ends of trunnion pins 88 thus moving locking roller 86 inwardly and upwardly along slots 84 to disengage the locking roller and cone 22 so that the lower portion of mounting ring 30b may be swung outwardly, with clips 32b serving as pivots.

Using the above constructions it will be observed that the supplementary lenses may be locked securely upon a camera with assurance that correct optical alignment will be maintained. And the supplementary lenses may easily be removed when it is desired to use the camera without varying the fixed focus.

From the foregoing it will be observed that a focusing attachment incorporating my invention is well adapted to attain the ends and objects hereinbefore set forth and to be economically manufactured since all parts of the combination readily lend themselves to mass production and to a wide latitude of variations as will become necessary in adapting the invention to different applications.

As many embodiments may be made of the above invention and as many changes may be made in the embodiments above set forth, it is to be understood that all matter hereinbefore set forth or shown in the accompanying drawings is to be interpreted as illustrative and not in a limiting sense.

I claim:

1. In camera construction, in combination, a camera having a body, a supporting grip on said body, an operating handle on one side of said body, a lens system mounted in said body, a supplementary lens carrying element rotatably mounted on a pivot eccentrically located with respect to the axis of said lens system, and a lens in said lens carrying element adapted to be rotatably swung about said pivot into alignment with the axis of said lens system; said pivot being located on that side of the axis of said lens system which is nearer said operating handle, said lens carrying element including a portion extending beyond the edge of the camera body so as to be visible and accessible from behind the camera when the camera is held in shooting position, and said operating handle being movable through an operating stroke at least a portion of which brings the hand of the operator into proximity with said portion of said lens carrying element.

2. The invention of claim 1 wherein said portion of said lens carrying element includes markings whereby when the camera is held in shooting position the operator can easily see the markings on said element to determine the relative position of said lens with respect to the axis of said lens system.

3. In camera construction, in combination, a camera having a body, a supporting grip on said body, an operating handle on one side of said body, a lens system mounted in said body, a view finder mounted on said body for aiming said lens system, a supplementary lens carrying element positioned forwardly of said view finder and rotatably mounted on a pivot eccentrically located with respect to the axis of said lens system, and a lens in said lens carrying element adapted to be rotatably swung about said pivot into alignment with the axis of said lens system; said pivot being located on that side of the axis of said lens system which is nearer said operating handle, said lens carrying element having an indicia carrying portion which extends beyond the body of the camera so that the position of said lens with respect to the axis of said lens system is at all times indicated while said camera is held in shooting position and said operating handle being movable through an operating stroke at least a portion of which brings the hand of the operator into proximity with said lens carrying element.

4. In camera construction, in combination, a camera having a body, a supporting grip on said body, an operating handle on one side of said body, a fixed focus lens mounted in said body, a supplementary lens carrying element rotatably mounted on a pivot eccentrically located with respect to the axis of said fixed focus lens, and a plurality of supplementary lenses in said lens carrying element adapted to be rotatably swung about said pivot and into alignment one at a time with the axis of said fixed focus lens; said pivot being located on that side of the axis of said fixed focus lens which is nearer said operating handle and said operating handle being movable through an operating stroke at least a portion of which brings the hand of the operator into proximity with said lens carrying element, whereby a desired combination of fixed focus, lens and supplementary lens may be rapidly effected without lowering the camera from shooting position.

GEORGE J. ARNOLD.

REFERENCES CITED

The following references are of record in the file of this patent:

UNITED STATES PATENTS

| Number | Name | Date |
|---|---|---|
| 494,128 | Decker | Mar. 28, 1893 |
| 1,818,062 | Howell | Aug. 11, 1931 |
| 2,205,179 | Schultz | June 18, 1940 |
| 2,362,813 | Gorey et al. | Nov. 14, 1944 |

FOREIGN PATENTS

| Number | Country | Date |
|---|---|---|
| 379,653 | France | Sept. 13, 1907 |